(No Model.)
V. A. THOMAS.
INSULATOR BRACKET.
No. 463,588. Patented Nov. 17, 1891.
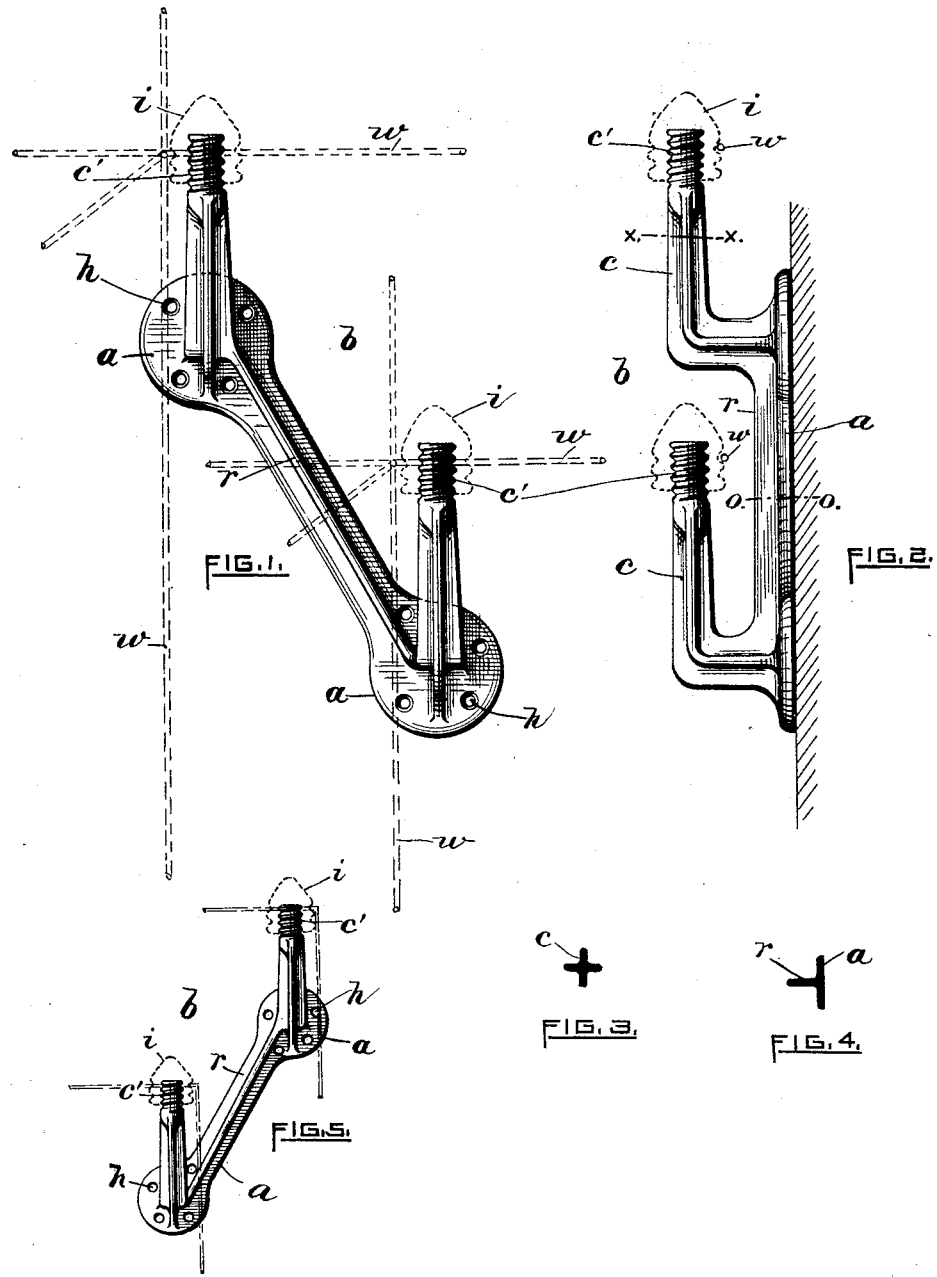
WITNESSES.
Charles Hannigan
H. E. Carpenter
INVENTOR.
Van A. Thomas.
by Remington & Henthorn
Attys.

UNITED STATES PATENT OFFICE.

VAN A. THOMAS, OF PROVIDENCE, RHODE ISLAND, ASSIGNOR OF ONE-HALF TO ANDREW D. ROSS, OF SAME PLACE.

INSULATOR-BRACKET.

SPECIFICATION forming part of Letters Patent No. 463,588, dated November 17, 1891.

Application filed May 21, 1891. Serial No. 393,546. (No model.)

*To all whom it may concern:*

Be it known that I, VAN A. THOMAS, a citizen of the United States, residing at Providence, in the county of Providence and State of Rhode Island, have invented certain new and useful Improvements in Insulator-Brackets; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My improvement herewith relates to the construction of brackets for supporting and guiding electric wires or cables used for the distribution of power and light at any desired angle from the face of a building, pole, or other desired structure; and it consists, essentially, of a cast-iron bracket composed of a base portion having enlarged ends for securing it to a wall or other surface, and further provided with integrally-formed upwardly-turned insulator-carrying arms, the axes of which are arranged at an inclination to the base, all as will be hereinafter set forth and claimed.

To clearly illustrate my invention, I have prepared the annexed sheet of drawings, in which—

Figure 1 represents a front elevation of a left-hand bracket embodying my improvement. Fig. 2 is a corresponding side elevation. Fig. 3 is a cross-section of one of the insulator-carrying arms, taken on line $x$ $x$ of Fig. 2. Fig. 4 is cross-sectional view of the base of the bracket, taken on line $o$ $o$ of Fig. 2; and Fig. 5 is a front elevation of a right-hand bracket.

A more specific description of my invention shown by the drawings is as follows:

$a$, Fig. 1, represents the base portion of the bracket $b$, terminating in enlarged ends provided with holes $h$, through which pass bolts or screws for securing the same to any suitable surface and as drawn at an angle of about forty-five degrees. The base is strengthened by the longitudinal central rib $r$, which unites at each end of the base with outwardly-projecting integrally-formed and upwardly-bent arms $c$, the upper portion $c'$ of each being screw-threaded or otherwise adapted to receive the glass or other suitable insulator $i$, as commonly used for this service. When the bracket is in position, these arms are substantially vertical. The arms may be cast to project any desired distance from the face of the wall, as desired. To each insulator is secured upon the inside—that is, between the face of the wall and the center of the insulator—the electric wire or cable $w$. The free end of the latter may be continued horizontally or diverted at any desired angle less than ninety degress upward or downward, depending upon whether the bracket is right or left hand and to the direction of the leading-wire. (See Figs. 1 and 5.)

I would state that the two wires $w$ usually run parallel with each other. The dotted lines, Fig. 1, indicate various directions in which the wires may be deflected, and at the same time be maintained a proper distance apart. This feature constitutes one of the essential advantages obtainable by the employment of my improved bracket $b$. These supporting-arms also serve largely as a safety-guard to prevent the wire from dropping down.

In the construction of my improved bracket I prefer that the same cross-sectionally be as represented by Figs. 3 and 4, as such form renders the bracket very strong with a minimum of material and a corresponding reduction in cost.

To apply the bracket $b$ to any desired surface, holes are drilled into the wall or other material and bolts or screws inserted through the enlarged ends of the base of the bracket, thus retaining the same securely in position, and is then in readiness to receive the insulators upon the ends of the bent arms $c$. Upon securing the electric wires or conductors thereto the whole forms a very neat, strong, safe, and comparatively inexpensive system of construction.

I claim as my invention—

The insulator-bracket, substantially as hereinbefore described, the same consisting of an attaching or base portion provided with arms or hooks adapted to receive insulators, the axes of the hooks being inclined to the direction of the base and having the plane of the attaching-face of the base parallel to said hooks.

In testimony whereof I have affixed my signature in presence of two witnesses.

VAN A. THOMAS.

Witnesses:
CHARLES HANNIGAN,
GEO. H. REMINGTON.